(12) United States Patent
Chen

(10) Patent No.: US 10,712,751 B2
(45) Date of Patent: Jul. 14, 2020

(54) METHOD AND DEVICE FOR TERRAIN SIMULATION FLYING OF UNMANNED AERIAL VEHICLE AND UNMANNED AERIAL VEHICLE

(71) Applicant: GUANGZHOU XAIRCRAFT TECHNOLOGY CO., LTD, Guangzhou (CN)

(72) Inventor: Yousheng Chen, Guangzhou (CN)

(73) Assignee: GUANGZHOU XAIRCRAFT TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 15/753,841

(22) PCT Filed: Jul. 31, 2017

(86) PCT No.: PCT/CN2017/095311
§ 371 (c)(1),
(2) Date: Feb. 20, 2018

(87) PCT Pub. No.: WO2018/024177
PCT Pub. Date: Feb. 8, 2018

(65) Prior Publication Data
US 2019/0146524 A1    May 16, 2019

(30) Foreign Application Priority Data
Aug. 3, 2016    (CN) .......................... 2016 1 0633363

(51) Int. Cl.
*G05D 1/06*       (2006.01)
*G05D 1/10*       (2006.01)
*B64C 39/02*    (2006.01)

(52) U.S. Cl.
CPC ......... *G05D 1/0646* (2013.01); *B64C 39/024* (2013.01); *G05D 1/101* (2013.01); *B64C 2201/12* (2013.01); *B64C 2201/141* (2013.01)

(58) Field of Classification Search
CPC .............. B64C 39/024; B64C 2201/12; B64C 2201/141; G05D 1/0646; G05D 1/101
(Continued)

(56) References Cited

U.S. PATENT DOCUMENTS 3,245,076 A * 4/1966 Michel .................... G01S 13/94
                                                                342/65
3,530,465 A * 9/1970 Zupanick ............. G05D 1/0646
                                                                342/65
(Continued)

FOREIGN PATENT DOCUMENTS

CN    204631626        *  9/2015
CN    204631626 U       9/2015
(Continued)

OTHER PUBLICATIONS

Extended European Search Report for corresponding European Application No. EP17836359.4, dated Mar. 6, 2019, 7 pages.

*Primary Examiner* — Joshua E Rodden
(74) *Attorney, Agent, or Firm* — Armstrong Teasdale LLP

(57) ABSTRACT

The embodiment of the disclosure relates to an Unmanned Aerial Vehicle (UAV) terrain simulation flying method and device, and a UAV. The method includes: acquiring a vertical distance between a UAV and the ground; acquiring an oblique distance between the UAV and the ground; acquiring an angle between the vertical distance and the oblique distance; and adjusting a terrain simulation flying state of the UAV according to the angle, the vertical distance and the oblique distance.

18 Claims, 4 Drawing Sheets

(58) Field of Classification Search
USPC .............................................................. 701/5
See application file for complete search history.

(56) References Cited

U.S. PATENT DOCUMENTS

| | | | | |
|---|---|---|---|---|
| 4,760,396 A | * | 7/1988 | Barney | G01C 21/005 |
| | | | | 342/65 |
| 8,989,924 B2 | * | 3/2015 | Seydoux | A63H 27/12 |
| | | | | 244/17.13 |
| 2004/0105090 A1 | * | 6/2004 | Schultz | G01C 11/02 |
| | | | | 356/141.5 |
| 2006/0138277 A1 | * | 6/2006 | Franceschini | G05D 1/0646 |
| | | | | 244/17.13 |
| 2007/0055418 A1 | * | 3/2007 | Pire | G01S 13/94 |
| | | | | 701/14 |
| 2008/0071431 A1 | | 3/2008 | Dockter et al. | |
| 2009/0125236 A1 | * | 5/2009 | Fontaine | G05D 1/0646 |
| | | | | 701/301 |
| 2009/0132103 A1 | * | 5/2009 | Marty | G01C 21/00 |
| | | | | 701/3 |
| 2010/0017114 A1 | | 1/2010 | Tehan et al. | |
| 2012/0173053 A1 | * | 7/2012 | Ohtomo | G01C 11/04 |
| | | | | 701/4 |
| 2013/0006448 A1 | * | 1/2013 | Callou | A63H 27/12 |
| | | | | 701/5 |
| 2017/0248969 A1 | * | 8/2017 | Ham | B64C 39/024 |
| 2018/0314268 A1 | * | 11/2018 | Tan | B64D 1/18 |

FOREIGN PATENT DOCUMENTS

| | | | |
|---|---|---|---|
| CN | 104977935 A | 10/2015 | |
| CN | 204883371 U | 12/2015 | |
| CN | 205060033 U | 3/2016 | |
| KR | 20140060901 A | 5/2014 | |
| WO | 2012084958 A1 | 6/2012 | |
| WO | WO-2012084958 A1 * | 6/2012 | ............ G01S 13/882 |

* cited by examiner

METHOD AND DEVICE FOR TERRAIN SIMULATION FLYING OF UNMANNED AERIAL VEHICLE AND UNMANNED AERIAL VEHICLE

CROSS-REFERENCE TO RELATED APPLICATIONS

This application is a U.S. National Phase Application of PCT/CN2017/095311, filed Jul. 31, 2017, which claims the benefit of priority to CN Application No. 201610633363.8, filed Aug. 3, 2016, the contents of which are hereby expressly incorporated by reference in their entirety.

TECHNICAL FIELD

The embodiments of the disclosure relate to the technical field of unmanned aerial vehicles, and more particularly to an unmanned aerial vehicle terrain simulation flying method, an unmanned aerial vehicle terrain simulation flying device, and an unmanned aerial vehicle.

BACKGROUND

An unmanned aerial vehicle is referred to as a UAV for short, capable of fulfilling a task such as aerial photography or reconnaissance. As compared to other agricultural machines, the UAV is greatly advantageous in agricultural plant protection, and has been recently and widely applied. However, in practical application, the UAV has some problems to be urgently solved.

For pesticide spraying, a spraying effect depends on the distance between the UAV and a plant. In a case that the UAV is farther away from the plant, it is very difficult to uniformly spray an atomized pesticide to the surface of the plant. In a case that the UAV is much closer to the plant, the operation efficiency of the UAV will be influenced. From the perspective of safety, in a case that the UAV is much closer to the plant, the flying safety coefficient is lower.

SUMMARY

In view of the above-mentioned problem, the embodiment of the disclosure provides a method for terrain simulation flying of the UAV, a corresponding Device for terrain simulation flying of the UAV and a UAV, which are intended to overcome the above-mentioned problem or at least partially solve the above-mentioned problem.

In order to solve the above-mentioned problem, the embodiment of the disclosure discloses a method for terrain simulation flying of the UAV, which includes:

acquiring a vertical distance between a UAV and the ground;

acquiring an oblique distance between the UAV and the ground;

acquiring an angle between the vertical distance and the oblique distance; and adjusting a terrain simulation flying state of the UAV according to the angle, the vertical distance and the oblique distance.

Alternatively, the step of adjusting a terrain simulation flying state of the UAV according to the angle, the vertical distance and the oblique distance includes:

calculating one or more items of judgment data by using the angle and the vertical distance;

composing one or more judgment data ranges by the one or more items of judgment data; and adjusting the terrain simulation flying state of the UAV according to a judgment data range within which the oblique distance falls.

Alternatively, the judgment data ranges include a first judgment data range, and the step of adjusting the terrain simulation flying state of the UAV according to a judgment data range within which the oblique distance falls includes:

in a case that the oblique distance falls within the first judgment data range, maintaining a terrain simulation flying speed of the UAV, and adjusting a terrain simulation flying height of the UAV according to the vertical distance.

Alternatively, the judgment data ranges include a second judgment data range, and the step of adjusting the terrain simulation flying state of the UAV according to a judgment data range within which the oblique distance falls includes:

in a case that the oblique distance always falls within the second judgment data range within a first schedule time, decreasing the terrain simulation flying speed of the UAV, and raising the terrain simulation flying height of the UAV; and in a case that falling within the second judgment data range is switched to falling within the first judgment data range after the oblique distance falls within the second judgment data range within a second schedule time, maintaining the terrain simulation flying speed of the UAV, and adjusting the terrain simulation flying height of the UAV according to the vertical distance, the second schedule time is smaller than the first schedule time.

Alternatively, the judgment data ranges include a third judgment data range, and the step of adjusting the terrain simulation flying state of the UAV according to a judgment data range within which the oblique distance falls includes:

in a case that the oblique distance falls within the third judgment data range, making the UAV hover, and raising the terrain simulation flying height of the UAV; and in a case that falling of the oblique distance within the third judgment data range is switched into falling into the second judgment data range, recovering the terrain simulation flying speed of the UAV, and controlling the terrain simulation flying height of the UAV according to the vertical distance.

Alternatively, the judgment data ranges include a fourth judgment data range, and the step of adjusting the terrain simulation flying state of the UAV according to a judgment data range within which the oblique distance falls includes:

in a case that the oblique distance always falls within the fourth judgment data range within a third schedule time, decreasing the terrain simulation flying speed of the UAV, and reducing the terrain simulation flying height of the UAV; and in a case that falling within the fourth judgment data range is switched to falling within the first judgment data range after the oblique distance falls within the fourth judgment data range within a fourth schedule time, maintaining the terrain simulation flying speed of the UAV, and adjusting the terrain simulation flying height of the UAV according to the vertical distance, the fourth schedule time is smaller than the third schedule time.

Alternatively, the judgment data ranges include a fifth judgment data range, and the step of adjusting the terrain simulation flying state of the UAV according to a judgment data range within which the oblique distance falls includes:

in a case that the oblique distance falls within the fifth judgment data range, making the UAV hover, or controlling the UAV to return.

The embodiment of the disclosure also discloses a Device for terrain simulation flying of the UAV, which includes:

a vertical distance acquisition component, configured to acquire a vertical distance between a UAV and the ground;

an oblique distance acquisition component, configured to acquire an oblique distance between the UAV and the ground;

an angle acquisition component, configured to acquire an angle between the vertical distance and the oblique distance; and a flying state adjustment component, configured to adjust a terrain simulation flying state of the UAV according to the angle, the vertical distance and the oblique distance.

Alternatively, the flying state adjustment component includes:

a judgment data calculation sub-component, configured to calculate one or more items of judgment data by using the angle and the vertical distance;

a judgment data range composing sub-component, configured to compose one or more judgment data ranges by the one or more items of judgment data; and a flying state adjustment sub-component, configured to adjust the terrain simulation flying state of the UAV according to a judgment data range within which the oblique distance falls.

Alternatively, the judgment data ranges include a first judgment data range, and the flying state adjustment sub-component includes:

a first flying state adjustment unit, configured to maintain, in a case that the oblique distance falls within the first judgment data range, a terrain simulation flying speed of the UAV, and control a terrain simulation flying height of the UAV according to the vertical distance.

Alternatively, the judgment data ranges include a second judgment data range, and the flying state adjustment sub-component includes:

a second flying state adjustment unit, configured to reduce, in a case that the oblique distance always falls within the second judgment data range within a first schedule time, the terrain simulation flying speed of the UAV, and raise the terrain simulation flying height of the UAV; and a third flying state adjustment unit, configured to maintain, in a case that falling within the second judgment data range is switched to falling within the first judgment data range after the oblique distance falls within the second judgment data range within a second schedule time, the terrain simulation flying speed of the UAV, and maintain the terrain simulation flying height of the UAV, the second schedule time is smaller than the first schedule time.

Alternatively, the judgment data ranges include a third judgment data range, and the flying state adjustment sub-component includes:

a fourth flying state adjustment unit, configured to make, in a case that the oblique distance falls within the third judgment data range, the UAV hover, and raise the terrain simulation flying height of the UAV; and a fifth flying state adjustment unit, configured to recover, in a case that falling of the oblique distance within the third judgment data range is switched into falling into the second judgment data range, the terrain simulation flying speed of the UAV, and control the terrain simulation flying height of the UAV according to the vertical distance.

Alternatively, the judgment data ranges include a fourth judgment data range, and the flying state adjustment sub-component includes:

a sixth flying state adjustment unit, configured to reduce, in a case that the oblique distance always falls within the fourth judgment data range within a third schedule time, the terrain simulation flying speed of the UAV, and reduce the terrain simulation flying height of the UAV; and a seventh flying state adjustment unit, configured to maintain, in a case that falling within the fourth judgment data range is switched to falling within the first judgment data range after the oblique distance falls within the fourth judgment data range within a fourth schedule time, the terrain simulation flying speed of the UAV, and adjust the terrain simulation flying height of the UAV according to the vertical distance, the fourth schedule time is smaller than the third schedule time.

Alternatively, the judgment data ranges include a fifth judgment data range, and the flying state adjustment sub-component includes:

an eighth flying state adjustment unit, configured to make, in a case that the oblique distance falls within the fifth judgment data range, the UAV hover, or control the UAV to return.

The embodiment of the disclosure also discloses a UAV, which includes: at least one vertically-downward vertical distance sensor configured to measure a vertical distance between the UAV and the ground; at least one obliquely-downward oblique distance sensor configured to measure an oblique distance between the UAV and the ground; and the above-mentioned Device for terrain simulation flying of the UAV.

DETAILED DESCRIPTION OF THE EMBODIMENTS

To make the aims, features and advantages of the disclosure obvious and easy to understand, the disclosure will be further described in detail below with reference to the drawings and specific implementation manners.

A UAV in the embodiment of the disclosure can autonomously fly by terrain simulation to improve the operation efficiency and effect of the UAV during operation and to improve the operation safety coefficient. The flying by terrain simulation refers, in short, to: the flying operation height of the UAV changes along with the ground irregularity, and the UAV always keeps a constant height from the ground.

For a plant protection UAV, most of existing plant protection UAV operation methods are used for flying at a fixed height with a Global Positioning System (GPS) or flying at a fixed height in a manual manner, or achieve simple terrain simulation flying by utilizing a single vertically-downward sensor such as a laser sensor, a sonar sensor and a millimeter radar. However, these methods can only adapt to flat terrains, cannot adapt to hilly lands, mountainous regions, terraced fields or high-stalk plants, and cannot even adapt to complicated environments of combined terrains of hilly lands, mountainous regions, terraced fields or high-stalk plants.

Specifically speaking, GPS fixed-height flying can only be used for flying operation at a constant altitude, and the UAV cannot operate by terrain simulation along with the ground irregularity, so the operation effect is poor. Due to influence of a sight distance, the manual flying is low in operation efficiency and difficult to popularize and apply on a large scale. A fixed-height terrain simulation flying method purely using a single sensor can only adapt to simple terrain simulation flying, cannot prejudge the change situation of ground terrain, and thus is poor in adaptability.

For the above-mentioned problems, the embodiment of the disclosure provides a method for terrain simulation flying of the UAV and device, capable of solving the problems of poor terrain simulation flying operation effect of the UAV, low operation efficiency, poor adaptability and the like, so the UAV autonomously flies by simulating the terrain in environments such as mountainous regions, hills, terraced fields, plains and high-stalk plants, the operation effect, operation efficiency and adaptability of the UAV are improved, and the safety of the UAV is improved.

It is important to note that the embodiment of the disclosure may be applied to other flying equipment except the UAV. The embodiment of the disclosure will be described in detail below.

Embodiment 1

Figure 1:
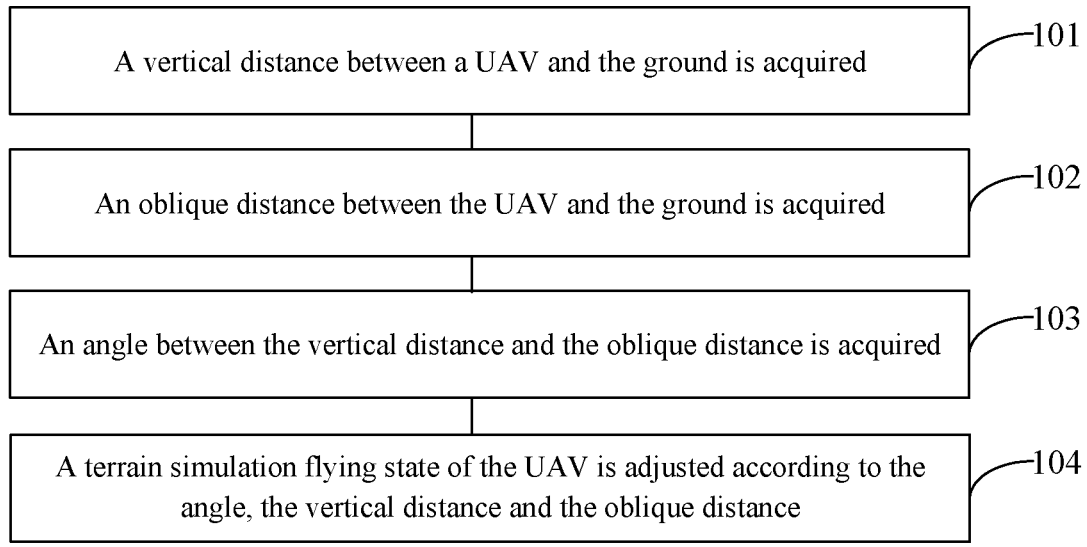
FIG. 1 is a step flowchart of Embodiment 1 for a method for terrain simulation flying of the UAV of the disclosure.

FIG. 1 shows a step flowchart of Embodiment 1 for a method for terrain simulation flying of the UAV of the disclosure. The method may specifically include the steps as follows.

Step 101: A vertical distance between a UAV and the ground is acquired.

Step 102: An oblique distance between the UAV and the ground is acquired.

Step 103: An angle between the vertical distance and the oblique distance is acquired.

A distance sensor may be installed on the UAV in the embodiment of the disclosure, and the distance between the UAV and the ground can be measured according to the distance sensor. Specifically speaking, the vertical distance between the UAV and the ground and the oblique distance between the UAV and the ground can be acquired by means of the distance sensor.

In one embodiment of the present application, at least one vertically-downward vertical distance sensor and at least one obliquely-downward oblique distance sensor may be installed on the UAV.

Herein, the vertical distance sensor is used for acquiring the vertical distance between the UAV and the ground, and the oblique distance sensor is used for acquiring the oblique distance between the UAV and the ground.

A vertically-downward distance sensor (vertical distance sensor) is installed on the UAV usually, but certainly, there may be multiple vertical distance sensors. Multiple obliquely-downward distance sensors (oblique distance sensor) are installed on the UAV usually, but certainly, there may be one oblique distance sensor.

It is important to note that the oblique distance sensor only acquires the oblique distance of the UAV in a forward direction of the UAV and has been enough to adjust a terrain simulation flying state of the UAV, so the UAV can fly by simulating the terrain in various environments, that is, it is only necessary to acquire the oblique distance sensor of the oblique distance in the forward direction of the UAV. However, in practical application, the oblique distance sensors may acquire oblique distances of other directions expect the forward direction of the UAV, and are used for adjusting the terrain simulation flying state of the UAV. It is unnecessary to limit in the embodiment of the disclosure.

According to a vehicle head of the UAV, it is supposed that the oblique distance sensors are installed in front, back, left and right directions of the vehicle head of the UAV. There may be two manners for acquiring the oblique distance.

Implementation Manner 1: only one oblique distance sensor works. Specifically, in a terrain simulation flying process of the UAV, in a case that the UAV moves forward toward the direction of the vehicle head, it is necessary to acquire the oblique distance of an oblique distance sensor in front of the vehicle head of the UAV, and at this time, the other oblique distance sensors may not work. In a case that the forward direction of the UAV is changed, e.g., the UAV turns to move forward toward the left side of the vehicle head, it is necessary to acquire the oblique distance of an oblique distance sensor on the left side of the vehicle head of the UAV, and at this time, the other oblique distance sensors may not work.

Implementation Manner 2: multiple oblique distance sensors work simultaneously. Specifically, in a terrain simulation flying process of the UAV, the oblique distances of the multiple oblique distance sensors are acquired. Even in a case that the forward direction of the UAV is changed, the oblique distances of the multiple oblique distance sensors are also continuously acquired.

Certainly, installation of the oblique distance sensors in the front, back, left and right directions of the vehicle head of the UAV is only exemplary. When the embodiment of the present application is implemented, the oblique distance sensors may be installed in a left front direction, a right front direction, a left back direction, a right back direction and other directions of the vehicle head of the UAV, which will not be limited in the embodiment of the disclosure. So, there may be less than or more than four oblique distance sensors practically. The number of the oblique distance sensors may be set according to actual demands and is not limited in the embodiment of the disclosure.

Herein, the angle between the vertical distance and the oblique distance may refer to an installation angle of the distance sensors namely an installation angle of the vertical distance sensor and the oblique distance sensor. Since the positions of the distance sensors on the UAV may be fixed, the angle between the distance sensors may be pre-stored and then extracted as needed. Certainly, the angle between the vertical distance and the oblique distance may be obtained by real-time detection, and is not limited in the embodiment of the disclosure.

Figure 2:
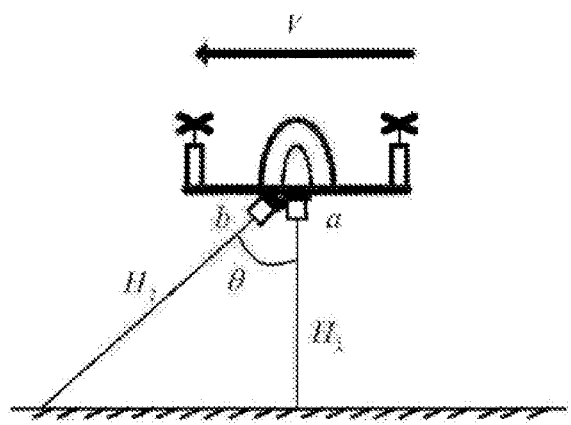
FIG. 2 is a diagram of UAV terrain simulation flying of the disclosure.

As shown in FIG. 2, a distance sensor a is a vertically-downward distance sensor that can be used for acquiring a vertical height $H_1$ between the UAV and the ground, and a distance sensor b is an oblique distance sensor in a forward direction of the UAV, which can be used for acquiring an oblique distance $H_2$ between the UAV and the ground. An angle between the distance sensor a and the distance sensor b is θ.

Specifically speaking, the distance sensor a is a UAV terrain simulation flying sensor for measuring a terrain simulation flying height of the UAV, and a flight controller of the UAV acquires a height of the UAV from the ground by reading the vertical height of the distance sensor a so as to control the UAV to maintain a pre-set height from the ground; and the distance sensor b is a UAV terrain predication judgment sensor for measuring the oblique distance between the UAV and the ground.

It is important to note that not only the distance sensors in the embodiment of the disclosure are limited as some specific sensors, but also a distance acquisition manner is not limited. Any equipment, assembly or method capable of obtaining the distance between the UAV and the ground shall fall within the scope of coverage of the embodiment of the disclosure.

Step 104: A terrain simulation flying state of the UAV is adjusted according to the angle, the vertical distance and the oblique distance.

In the embodiment of the disclosure, the terrain simulation flying state of the UAV is comprehensively adjusted according to the angle, the vertical distance and the oblique distance. Compared with a traditional constant-altitude UAV flying manner, the UAV in the embodiment of the disclosure can fly by simulating the terrain in various environments, thereby improving the operation efficiency and reliability of the UAV.

According to the embodiment of the disclosure, in a terrain simulation flying process of a UAV, a vertical distance between the UAV and the ground is acquired, and then a terrain simulation flying state of the UAV is adjusted according to the vertical distance, the oblique distance and an angle between the vertical distance and the oblique distance. The UAV in the embodiment of the disclosure can be controlled to make different flying movements according to different oblique distances between the UAV and the ground, thereby enabling the UAV to fly by simulating the terrain in various environments such as mountainous regions, hills, terraced fields, plains and high-stalk plants. Not only the operation efficiency of the UAV and the ability of the UAV to adapt to environments are improved, but also the reliability and safety of the UAV are improved. The embodiment of the disclosure is particularly applied to plant protection UAVs that need to keep a constant height from the ground and need to adapt to operation in various environments.

Figure 3:
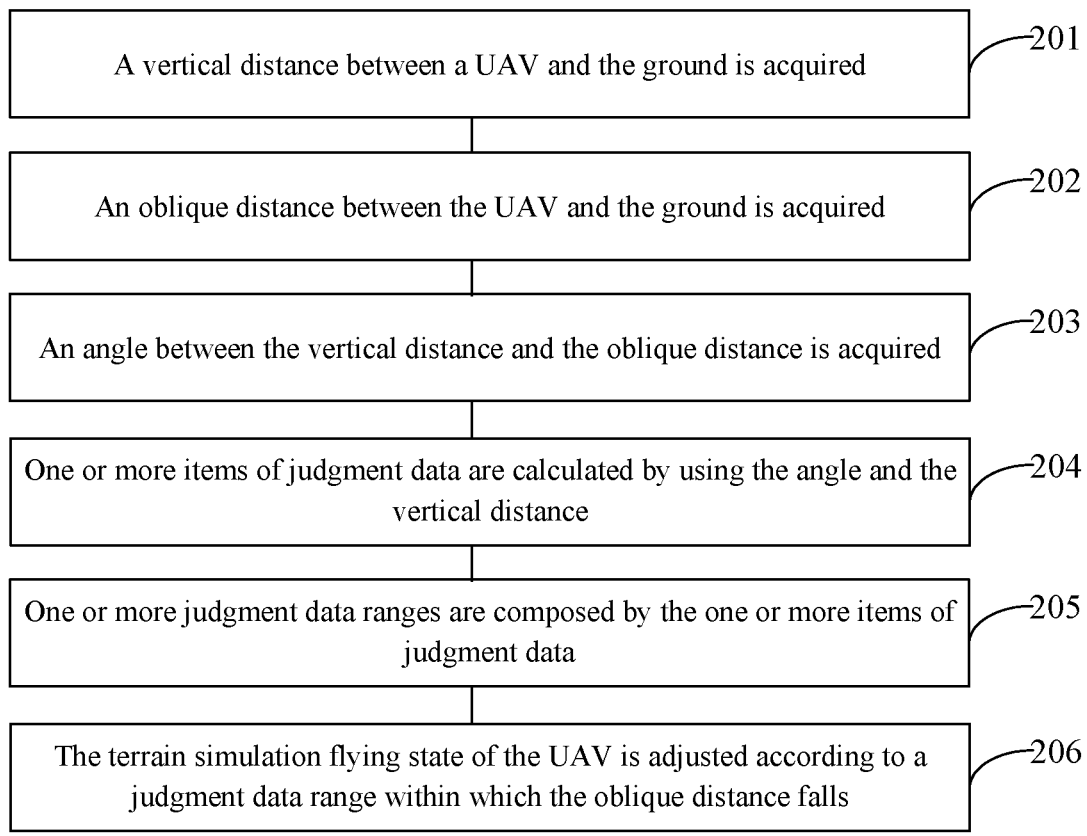
FIG. 3 is a step flowchart of Embodiment 2 for a method for terrain simulation flying of the UAV of the disclosure.

FIG. 3 shows a step flowchart of Embodiment 2 for a method for terrain simulation flying of the UAV of the disclosure. The method may specifically include the steps as follows.

Step 201: A vertical distance between a UAV and the ground is acquired.

Step 202: An oblique distance between the UAV and the ground is acquired.

Step 203: An angle between the vertical distance and the oblique distance is acquired.

Specific implementation manners of Step 201 to Step 203 in Method Embodiment 2 basically correspond to the specific implementation manners in Method Embodiment 1, so non-detailed descriptions for Step 201 to Step 203 in the present embodiment may refer to relevant descriptions in Embodiment 1, and will not be elaborated herein.

In specific implementation, terrain simulation flying of the UAV refers to that: when the ground bulges, the UAV ascends along with the ground, and when the ground sinks, the UAV descends along with the ground, namely the height between the UAV and the ground is constant. Meanwhile, the flying speed of the UAV may be constant or inconstant, where the constant value may be adjusted by a user. The horizontal flying speed of the UAV is not required in the embodiment of the disclosure, may be set according to actual demands, and falls within the scope of coverage of the disclosure.

Under some conditions such as field ditches and small gaps between high-stalk plants, the UAV needs to autonomously judge whether it is necessary to change along with the change of the terrain in advance. In a case that the height of the UAV is adjusted along with the change of the terrain without pre-judgment, not only the working efficiency is low and the UAV may be damaged under some terrains, but also the safety of the UAV is reduced.

Therefore, a terrain simulation flying state of the UAV is adjusted by combining the vertical distance, the oblique distance and the angle between the vertical distance and the oblique distance in the embodiment of the disclosure. It is important to note that the angle is associated with the flying height and speed generally, and in a case that the flying height and speed during agricultural operation are within a fixed range, the angle will be within a fixed range. That is because in a case that the angle is too large, an oblique sensor will become horizontal, and in a case that the angle is too small, the oblique sensor will become vertical. So, the angle is usually a fixed value, can be directly obtained as needed, and does not need to be measured.

It is important to note that the magnitude of the angle is usually fixed, but may be not fixed, and may be dynamically adjusted according to a flying environment. For example, in case of flat terrain, the angle may be increased, so a pre judgment distance can be increased. In case of rough terrain, the angle may be decreased, so the terrain condition can be more accurately pre-judged. That is the same as a principle where high beams of an automobile are turned on when a road is straight and low beams are turned on when the road condition is complicated.

The angle in the embodiment of the present application may be fixed or not fixed. When the embodiment of the present application is implemented, the angle is set according to actual conditions. The embodiment of the present application does not need to limit the angle as a fixed angle.

In a preferable embodiment, a specific process that the UAV judges whether it is necessary to change along with the change of the terrain is as shown in Step 204 to Step 206.

Step 204: One or more items of judgment data are calculated by using the angle and the vertical distance.

In the embodiment of the disclosure, one or more items of judgment data may be calculated according to the vertical distance and the angle between the vertical distance and the oblique distance firstly.

Step 205: One or more judgment data ranges are composed by the one or more items of judgment data.

In the embodiment of the disclosure, one or more judgment data ranges are composed according to the one or more calculated items of judgment data according to a certain rule to serve as a criterion for adjusting the flying state of the UAV.

Specifically, the judgment data ranges may include:

a first judgment data range $2/3*H_1/\cos\theta < H_2 < 4/3*H_1/\cos\theta$, a second judgment data range $1/3*H_1/\cos\theta < H_2 \leq 2/3*H_1/\cos\theta$, a third judgment data range $2/3*H_1/\cos\theta < H_2$, a fourth judgment data range $4/3*H_1/\cos\theta < H_2 < 2*H_1/\cos\theta$, and a fifth judgment data range $2*H_1/\cos\theta < H_2$, where $H_1$ is the vertical distance, $H_2$ is the oblique distance, and $\theta$ is the angle between the vertical distance and the oblique distance.

It is important to note that the above-mentioned judgment data ranges are only exemplary. When the embodiment of the present application is implemented, the judgment data may be calculated according to actual situations, and the judgment data ranges may be adjusted. No limitations are made in the embodiment of the disclosure.

In addition, the above-mentioned several judgment conditions may be combined into fewer judgment conditions, or some judgment conditions may be subdivided into more conditions. The judgment conditions may be adjusted according to actual situations likewise. No limitations are made in the embodiment of the disclosure likewise.

Step 206: The terrain simulation flying state of the UAV is adjusted according to a judgment data range within which the oblique distance falls.

In the embodiment of the disclosure, the terrain simulation flying state of the UAV is adjusted according to the judgment data range within which the oblique distance falls, so the UAV can fly in various environments, thereby improving the operation efficiency and reliability of the UAV, where adjusting the flying state of the UAV may include: adjusting the flying height of the UAV, adjusting the flying speed of the UAV, and certainly, making the UAV hover and controlling the UAV to return.

In a normal terrain simulation flying process of the UAV, the flying speed and flying height of the UAV are constant. In the terrain simulation flying process of the UAV according to the embodiment of the disclosure, adaptive adjustment will be made according to the terrain.

In order to make those skilled in the art better understand the embodiment of the disclosure, several conditions for adjusting the terrain simulation flying state of the UAV are described according to several judgment data ranges listed above.

Condition 1:

In a case that the oblique distance falls within the first judgment data range, a terrain simulation flying speed of the UAV is maintained, and a terrain simulation flying height of the UAV is adjusted according to the vertical distance.

That is, $H_2$ satisfies Formula (1):

$$2/3 * H_1 / \cos\theta < H_2 < 4/3 * H_1 / \cos\theta \quad (1)$$

In a case that $H_2$ satisfies Formula (1), it is shown that the ground irregularity range is $\pm 1/3 H_1$, namely the ground irregularity is small. In this case, the UAV may directly adjust the flying height according to $H_1$ measured by the distance sensor a, the terrain simulation flying speed of the UAV is maintained, and other movements are not needed.

Condition 2:

In a case that the oblique distance always falls within the second judgment data range within a first schedule time, the terrain simulation flying speed of the UAV is reduced, and the terrain simulation flying height of the UAV is improved; and in a case that falling within the second judgment data range is switched to falling within the first judgment data range after the oblique distance falls within the second judgment data range within a second schedule time, the terrain simulation flying speed of the UAV is maintained, and the terrain simulation flying height of the UAV is adjusted according to the vertical distance, the second schedule time is smaller than the first schedule time.

That is, $H_2$ satisfies Formula (2) or Formula (1):

$$1/3 * H_1 / \cos\theta < H_2 < 2/3 * H_1 / \cos\theta \quad (2)$$

Figure 4:
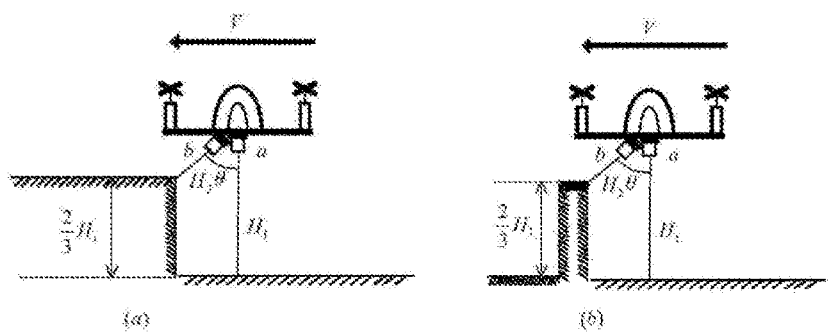
FIG. 4 is a diagram of UAV terrain simulation flying under Condition 2 of the disclosure.

Condition 2 may be subdivided into two conditions, as shown in FIG. 4-(*a*) and FIG. 4-(*b*) respectively.

Sub-condition 1: in a case that $H_2$ measured by the distance sensor b within the first schedule time always satisfies Formula (2), as shown in FIG. 4-(*a*), it is shown that there is an abrupt slope in a forward direction of the UAV. From the perspective of safety, the UAV needs to reduce the flying speed and is controlled to start ascending the abrupt slope. When the UAV climbs up the abrupt slope, and after $H_2$ satisfies Formula (1), the UAV continuously operates at the original flying speed. Certainly, the terrain simulation flying height is continuously adjusted according to $H_1$ measured by the distance sensor a.

Sub-condition 2: in a case that $H_2$ measured by the distance sensor b within the first schedule time only satisfies Formula (2) within a short time (second schedule time) and also satisfies Formula (1) within the first schedule time, as shown in FIG. 4-(*b*), it is shown that there is a narrow bulge from the ground and the height of the bulge is smaller than $2/3 H_2$. In this case, when the UAV flies over the bulge, the UAV does not need to ascend, but continuously flies according to the original height and speed by directly ignoring the bulge.

Condition 3:

In a case that the oblique distance falls within the third judgment data range, the UAV hovers, and the terrain simulation flying height of the UAV is improved; and in a case that falling of the oblique distance within the third judgment data range is switched into falling into the second judgment data range, the terrain simulation flying speed of the UAV is recovered, and the terrain simulation flying height of the UAV is controlled according to the vertical distance.

That is, $H_2$ satisfies Formula (3) and Formula (2):

$$2/3 * H_1 / \cos\theta < H_2 \quad (3)$$

Figure 5:
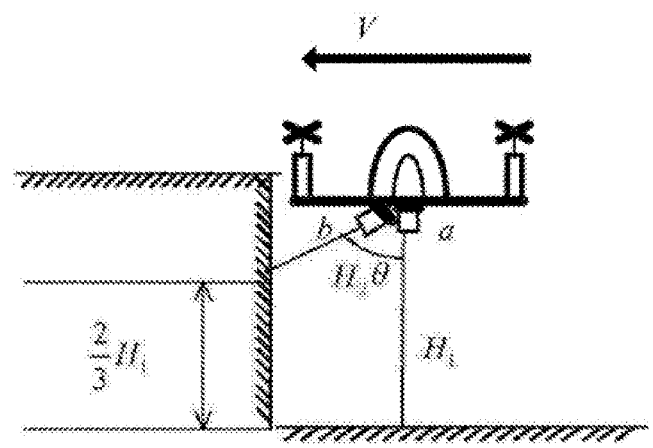
FIG. 5 is a diagram of UAV terrain simulation flying under Condition 3 of the disclosure.

In a case that $H_2$ satisfies Formula (3), it is shown that there is an abrupt slope having a large magnitude or a vertical barrier in the forward direction of the UAV. Typical conditions such as ridges of terraced fields or hilly lands are as shown in FIG. 5. In a case that flying at a current flying height continuously, the UAV may collide with the abrupt slope or the barrier, so the UAV needs to emergently hover and ascend at this time. When $H_2$ measured by the distance sensor b satisfies Formula (2), that is, the condition as shown in FIG. 4, the UAV may continuously move forward, the speed may be recovered to the original terrain simulation flying speed of the UAV at this time, and the terrain simulation flying height of the UAV is continuously controlled according to $H_2$ measured by the distance sensor b.

Condition 4:

In a case that the oblique distance always falls within the fourth judgment data range within a third schedule time, the terrain simulation flying speed of the UAV is reduced, and the terrain simulation flying height of the UAV is reduced; and in a case that falling within the fourth judgment data range is switched to falling within the first judgment data range after the oblique distance falls within the fourth judgment data range within a fourth schedule time, the terrain simulation flying speed of the UAV is maintained, and the terrain simulation flying height of the UAV is adjusted according to the vertical distance, the fourth schedule time is smaller than the third schedule time.

That is, $H_2$ satisfies Formula (4) or Formula (1):

$$4/3 * H_1 / \cos\theta < H_2 < 2 * H_1 / \cos\theta \quad (4)$$

Figure 6:
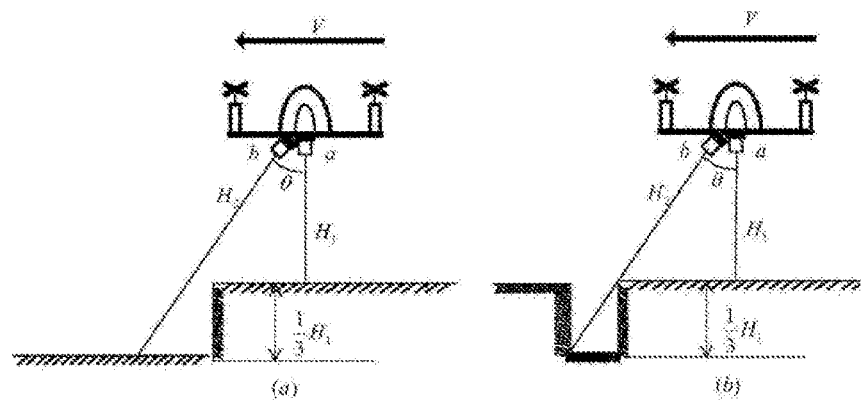
FIG. 6 is a diagram of UAV terrain simulation flying under Condition 4 of the disclosure.

Condition 4 may be subdivided into two conditions, as shown in FIG. 6-(*a*) and FIG. 6-(*b*) respectively.

Sub-condition 1: in a case that $H_2$ measured by the distance sensor b within the third schedule time always satisfies Formula (1), as shown in FIG. 6-(a), it is shown that there is a large pit in the forward direction of the UAV. The UAV needs to reduce the flying speed.

When $H_2$ measured by the distance sensor b satisfies Formula (1), the UAV continuously operates at the original flying speed.

Sub-condition 2: in a case that the value measured by the distance sensor b satisfies Formula (4) within a short time (fourth schedule time) and then satisfies Formula (1), as shown in FIG. 6-(b), it is shown that there is a narrow pit in the ground such as a field drainage ditch or a sparse region in high-stalk plants, the UAV does not need to descend, and continuously flies according to the original speed by directly ignoring the pit, and the terrain simulation flying height of the UAV is controlled according to $H_2$ measured by the distance sensor b.

It is important to note that the first schedule time and the third schedule time may be set to be identical or different. For example, the first schedule time and the third schedule time may be set as 10 m or 20 m. The second schedule time and the fourth schedule time may be set to be identical or different. For example, the second schedule time and the fourth schedule time may be set as 1 m or 2 m. These times are set according to actual conditions, and are not limited in the embodiment of the disclosure.

Condition 5:

In a case that the oblique distance falls within the fifth judgment data range, the UAV hovers, or the UAV is controlled to return.

That is, $H_2$ satisfies Formula (5):

$$2*H_1/\cos\theta < H_2 \qquad (5)$$

Figure 7:
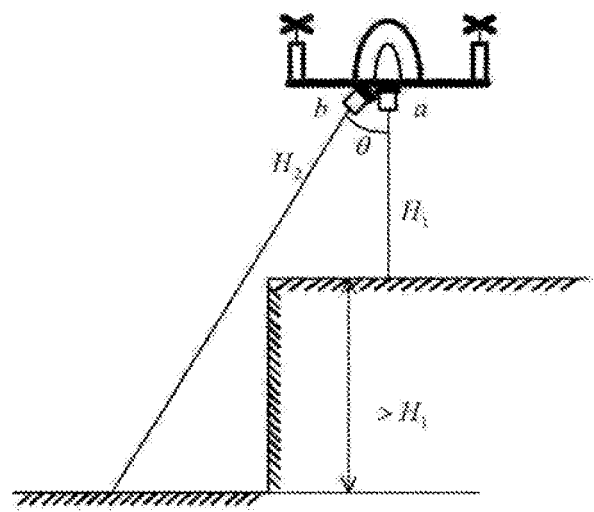
FIG. 7 is a diagram of UAV terrain simulation flying under Condition 5 of the disclosure.

In a case that $H_2$ satisfies Formula (5), it is shown that the forward direction of the UAV and the current position greatly differ in height, as shown in FIG. 7. Due to a huge height difference and in the presence of indeterminacy, from the perspective of safety, the UAV should hover or return.

It is important to note that the above-mentioned several conditions for adjusting the terrain simulation flying state of the UAV according to a judgment data range within which the oblique distance falls are only exemplary. When the embodiment of the present application is implemented, the state may be adjusted according to actual situations. For example, in a case that it is known that it is absolutely impossible for the operation ground to satisfy some conditions, the judgment process in this condition may be selectively removed, thus shortening the judgment time of the UAV. No limitations are made in the embodiment of the disclosure.

According to the embodiment of the disclosure, a vertically-downward distance sensor a controls a terrain simulation flying height of a UAV, and one or more distance sensors b installed in a forward direction of the UAV predict the height conditions of the forward direction of the UAV. The UAV makes different movements for different heights of the forward direction, thereby enabling the UAV to fly by simulating the terrain in various complicated environments such as mountainous regions, hills, terraced fields and plains. The operation efficiency of the UAV is improved, and the safety and reliability of the UAV are improved.

It is important to note that for convenience of simple description, the method embodiment is expressed as a series of movement combinations. However, those skilled in the art should learn of that the embodiment of the disclosure is not limited by a described movement sequence. That is because some steps may be executed in other sequences or at the same time according to the embodiment of the disclosure. Secondly, those skilled in the art should also learn of that the embodiment described in the specification falls within preferable embodiments, and involved movements may not be necessary for the embodiment of the disclosure.

Figure 8:
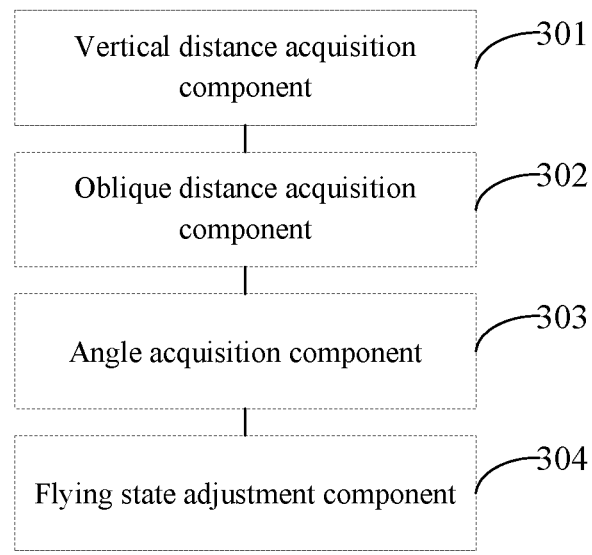
FIG. 8 is a block diagram of an embodiment for a device for terrain simulation flying of the UAV of the disclosure.

FIG. 8 shows a block diagram of an embodiment for a Device for terrain simulation flying of the UAV of the disclosure. The device may specifically include the following components:

a vertical distance acquisition component 301, configured to acquire a vertical distance between a UAV and the ground;

an oblique distance acquisition component 302, configured to acquire an oblique distance between the UAV and the ground;

an angle acquisition component 303, configured to acquire an angle between the vertical distance and the oblique distance; and a flying state adjustment component 304, configured to adjust a terrain simulation flying state of the UAV according to the angle, the vertical distance and the oblique distance.

In a preferable embodiment of the disclosure, the flying state adjustment component 304 may include the following sub-components:

a judgment data calculation sub-component, configured to calculate one or more items of judgment data by using the angle and the vertical distance;

a judgment data range composing sub-component, configured to compose one or more judgment data ranges by the one or more items of judgment data; and a flying state adjustment sub-component, configured to adjust the terrain simulation flying state of the UAV according to a judgment data range within which the oblique distance falls.

In a preferable embodiment of the disclosure, the judgment data ranges include a first judgment data range, and the flying state adjustment sub-component may include the following sub-component:

a first flying state adjustment unit, configured to maintain, in a case that the oblique distance falls within the first judgment data range, a terrain simulation flying speed of the UAV, and control a terrain simulation flying height of the UAV according to the vertical distance.

In a preferable embodiment of the disclosure, the judgment data ranges include a second judgment data range, and the flying state adjustment sub-component may include the following sub-components:

a second flying state adjustment unit, configured to reduce, in a case that the oblique distance always falls within the second judgment data range within a first schedule time, the terrain simulation flying speed of the UAV, and raise the terrain simulation flying height of the UAV; and a third flying state adjustment unit, configured to maintain, in a case that falling within the second judgment data range is switched to falling within the first judgment data range after the oblique distance falls within the second judgment data range within a second schedule time, the terrain simulation flying speed of the UAV, and control the terrain simulation flying height of the UAV according to the vertical distance.

In a preferable embodiment of the disclosure, the judgment data ranges include a third judgment data range, and the flying state adjustment sub-component may include the following sub-components:

a fourth flying state adjustment unit, configured to make, in a case that the oblique distance falls within the third judgment data range, the UAV hover, and raise the terrain simulation flying height of the UAV; and a fifth flying state adjustment unit, configured to recover, in a case that falling of the oblique distance within the third judgment data range is switched into falling into the second judgment data range, the terrain simulation flying speed of the UAV, and control the terrain simulation flying height of the UAV according to the vertical distance.

In a preferable embodiment of the disclosure, the judgment data ranges include a fourth judgment data range, and the flying state adjustment sub-component may include the following sub-components:

a sixth flying state adjustment unit, configured to reduce, in a case that the oblique distance always falls within the fourth judgment data range within a third schedule time, the terrain simulation flying speed of the UAV, and reduce the terrain simulation flying height of the UAV; and a seventh flying state adjustment unit, configured to maintain, in a case that falling within the fourth judgment data range is switched to falling within the first judgment data range after the oblique distance falls within the fourth judgment data range within a fourth schedule time, the terrain simulation flying speed of the UAV, and control the terrain simulation flying height of the UAV according to the vertical distance.

In a preferable embodiment of the disclosure, the judgment data ranges include a fifth judgment data range, and the flying state adjustment sub-component may include the following sub-component:

an eighth flying state adjustment unit, configured to make, in a case that the oblique distance falls within the fifth judgment data range, the UAV hover, or control the UAV to return.

In a preferable embodiment of the disclosure, the first judgment data range may be $2/3*H_1/COS\ \theta<H_2<4/3*H_1/COS\ \theta$, the second judgment data range may be $1/3*H_1/COS\ \theta<H_2\leq2/3*H_1/COS\ \theta$, the third judgment data range may be $2/3*H_1/COS\ \theta<H_2$, the fourth judgment data range may be $4/3*H_1/COS\ \theta<H_2<2*H_1/COS\ \theta$, and the fifth judgment data range may be $2*H_1/COS\ \theta<H_2$, where $H_1$ is the vertical distance, $H_2$ is the oblique distance, and $\theta$ is the angle between the vertical distance and the oblique distance.

Due to basic similarity to the method embodiment, the device embodiment is simply described. Relevant parts refer to part of descriptions for the method embodiment.

The UAV of the disclosure may specifically include: at least one vertically-downward vertical distance sensor, configured to measure a vertical distance between the UAV and the ground; at least one obliquely-downward oblique distance sensor, configured to measure an oblique distance between the UAV and the ground; and the above-mentioned Device for terrain simulation flying of the UAV. A vertical distance acquisition component 301 in the Device for terrain simulation flying of the UAV acquires a vertical distance between the UAV and the ground from the vertical distance sensor, and an oblique distance acquisition component 302 in the Device for terrain simulation flying of the UAV acquires an oblique distance between the UAV and the ground from the oblique distance sensor.

The embodiment of the present application also provides a storage medium. Alternatively, in the present embodiment, the above-mentioned storage medium may be used for storing program codes for executing the UAV terrain simulation flying method provided in the above-mentioned embodiment.

Alternatively, in the present embodiment, the above-mentioned storage medium may be located in any one computer terminal in a computer terminal group in a computer network or located in a mobile terminal group.

Alternatively, in the present embodiment, the storage medium is configured to store program codes for executing the following steps: acquiring a vertical distance between a UAV and the ground; acquiring an oblique distance between the UAV and the ground; acquiring an angle between the vertical distance and the oblique distance; and adjusting a terrain simulation flying state of the UAV according to the angle, the vertical distance and the oblique distance.

The embodiment of the present application also provides a processor. Alternatively, in the present embodiment, the above-mentioned processor may run the following program codes for executing the UAV terrain simulation flying method provided in the above-mentioned embodiment: acquiring a vertical distance between a UAV and the ground; acquiring an oblique distance between the UAV and the ground; acquiring an angle between the vertical distance and the oblique distance; and adjusting a terrain simulation flying state of the UAV according to the angle, the vertical distance and the oblique distance.

All embodiments in the present specification are described in a progressive manner. Each embodiment emphasizes differences from other embodiments, and identical or similar parts between all the embodiments refer to each other.

Those skilled in the art should understand that the embodiment of the disclosure may be provided as a method, a device or a computer program product. Thus, forms of complete hardware embodiments, complete software embodiments or embodiments integrating software and hardware may be adopted in the embodiment of the disclosure. Moreover, a form of computer program product implemented on one or more computer available storage media (including, but not limited to, a disk memory, a CD Read-Only Memory (CD-ROM), an optical memory and the like) containing computer available program codes may be adopted in the embodiment of the disclosure.

The embodiment of the disclosure is described with reference to flowcharts and/or block diagrams of the method, terminal equipment (system) and the computer program product according to the embodiment of the disclosure. It will be appreciated that each flow and/or block in the flowcharts and/or the block diagrams and combination of the flows and/or the blocks in the flowcharts and/or the block diagrams may be implemented by computer program instructions. These computer program instructions may be provided for a general computer, a dedicated computer, an embedded processor or processors of other programmable data processing terminal equipment to generate a machine, such that a device for implementing functions designated in one or more flows of the flowcharts and/or one or more blocks of the block diagrams is generated via instructions executed by the computers or the processors of the other programmable data processing terminal equipment.

These computer program instructions may also be stored in a computer readable memory capable of guiding the computers or the other programmable data processing terminal equipment to work in a specific manner, so that a manufactured product including an instruction device is generated via the instructions stored in the computer readable memory, and the instruction device achieves the functions designated in one or more flows of the flowcharts and/or one or more blocks of the block diagrams.

These computer program instructions may also be loaded to the computers or the other programmable data processing terminal equipment, so that processing implemented by the computers is generated by executing a series of operation steps on the computers or the other programmable terminal equipment, and therefore the instructions executed on the computers or the other programmable terminal equipment provide a step of achieving the functions designated in one or more flows of the flowcharts and/or one or more blocks of the block diagrams.

Although the preferable embodiments in the embodiments of the disclosure have been described, once obtaining basic creative concepts, those skilled in the art may make additional changes and modifications on these embodiments. Thus, the appended claims are intended to be interpreted as including all the changes and modifications on the preferable embodiments and falling within the scope of the embodiments of the disclosure.

Finally, it is also important to note that relation terms such as 'first' and 'second' are only used for distinguishing an entity or operation from another entity or operation herein, it is not required or implied that these entities or operations have any practical relation or sequence. Moreover, terms 'include', 'have' or any other inflexions thereof are intended to cover non-exclusive inclusions, such that a process, a method, an article or terminal equipment including a series of elements not only includes those elements, but also includes other elements that are not clearly listed, or further includes elements inherent to the process, the method, the article or the terminal equipment. Under the condition of no more limitations, it is not excluded that additional identical elements exist in the process, the method, the article or the terminal equipment including elements defined by a sentence 'including a . . . '.

The UAV terrain simulation flying method, the Device for terrain simulation flying of the UAV and the UAV provided in the disclosure are introduced in detail above. The principle and implementation manner of the disclosure are elaborated by using specific examples herein, and the above descriptions for the embodiments are only used for assisting in understanding the method of the disclosure and the core idea thereof. Meanwhile, as will occur to a person of ordinary skill in the art, there will be changes in the specific implementation manners and the application scope according to the idea of the disclosure. To sum up, the content of the present specification should not be understood as limitations to the disclosure.

INDUSTRIAL APPLICABILITY

The solution provided in the embodiment of the disclosure may be applied to a terrain simulation flying process of a UAV. By means of the solution provided in the embodiment of the disclosure, the UAV in the embodiment of the disclosure can be controlled to make different flying movements according to different oblique distances between the UAV and the ground, thereby enabling the UAV to fly by simulating the terrain in various environments such as mountainous regions, hills, terraced fields, plains and highstalk plants. Not only the operation efficiency of the UAV and the ability of the UAV to adapt to environments are improved, but also the reliability and safety of the UAV are improved. The embodiment of the disclosure is particularly applied to plant protection UAVs that need to keep a constant height from the ground and need to adapt to operation in various environments.

What is claimed is:

1. A method for terrain simulation flying of an Unmanned Aerial Vehicle (UAV), comprising:
    acquiring a vertical distance between the UAV and a ground;
    acquiring an oblique distance between the UAV and the ground;
    acquiring an angle between the vertical distance and the oblique distance; and
    a step of adjusting a terrain simulation flying state of the UAV according to the angle, the vertical distance and the oblique distance;
    wherein the step of adjusting the terrain simulation flying state of the UAV according to the angle, the vertical distance and the oblique distance comprises:
    calculating one or more items of judgment data by using the angle and the vertical distance;
    composing one or more judgment data ranges by the one or more items of judgment data; and
    a step of adjusting the terrain simulation flying state of the UAV according to one of the judgment data ranges within which the oblique distance falls.

2. The method as claimed in claim 1, wherein the judgment data ranges comprise a first judgment data range, and the step of adjusting the terrain simulation flying state of the UAV according to a judgment data range within which the oblique distance falls comprises:
    in a case that the oblique distance falls within the first judgment data range, maintaining a terrain simulation flying speed of the UAV, and adjusting a terrain simulation flying height of the UAV according to the vertical distance.

3. The method as claimed in claim 2, wherein the judgment data ranges comprise a second judgment data range, and the step of adjusting the terrain simulation flying state of the UAV according to the judgment data range within which the oblique distance falls comprises:
    in a case that the oblique distance always falls within the second judgment data range within a first schedule time, decreasing the terrain simulation flying speed of the UAV, and raising the terrain simulation flying height of the UAV; and
    in a case that the oblique distance is switched to falling within the first judgment data range from the second judgment data range after the oblique distance falls within the second judgment data range within a second schedule time, maintaining the terrain simulation flying speed of the UAV, and adjusting the terrain simulation flying height of the UAV according to the vertical distance, the second schedule time is smaller than the first schedule time.

4. The method as claimed in claim 3, wherein the judgment data ranges comprise a third judgment data range, and the step of adjusting the terrain simulation flying state of the UAV according to the judgment data range within which the oblique distance falls comprises:
    in a case that the oblique distance falls within the third judgment data range, making the UAV hover, and raising the terrain simulation flying height of the UAV; and
    in a case that falling of the oblique distance within the third judgment data range is switched into falling into the second judgment data range, recovering the terrain simulation flying speed of the UAV, and controlling the terrain simulation flying height of the UAV according to the vertical distance.

5. The method as claimed in claim 2, wherein the judgment data ranges comprise a fourth judgment data range, and the step of adjusting the terrain simulation flying state of the UAV according to the judgment data range within which the oblique distance falls comprises:

in a case that the oblique distance always falls within the fourth judgment data range within a third schedule time, decreasing the terrain simulation flying speed of the UAV, and reducing the terrain simulation flying height of the UAV; and in a case that falling within the fourth judgment data range is switched to falling within the first judgment data range after the oblique distance falls within the fourth judgment data range within a fourth schedule time, maintaining the terrain simulation flying speed of the UAV, and adjusting the terrain simulation flying height of the UAV according to the vertical distance, the fourth schedule time is smaller than the third schedule time.

6. The method as claimed in claim 1, wherein the judgment data ranges comprise a fifth judgment data range, and a step of adjusting the terrain simulation flying state of the UAV according to the judgment data range within which the oblique distance falls comprises:

in a case that the oblique distance falls within the fifth judgment data range, making the UAV hover, or controlling the UAV to return.

7. A device for terrain simulation flying of an Unmanned Aerial Vehicle (UAV), the device has a hardware processor configured to execute program instructions stored on a memory, the program instructions comprise:

acquiring a vertical distance between the UAV and a ground;

acquiring an oblique distance between the UAV and the ground;

acquiring an angle between the vertical distance and the oblique distance; and a step of adjusting a terrain simulation flying state of the UAV according to the angle, the vertical distance and the oblique distance;

wherein the step of adjusting the terrain simulation flying state of the UAV according to the angle, the vertical distance and the oblique distance comprises:

calculating one or more items of judgment data by using the angle and the vertical distance;

composing one or more judgment data ranges by the one or more items of judgment data; and a step of adjusting the terrain simulation flying state of the UAV according to one of the judgment data ranges within which the oblique distance falls.

8. The device as claimed in claim 7, wherein the judgment data ranges comprise a first judgment data range, and the step of adjusting the terrain simulation flying state of the UAV according to a judgment data range within which the oblique distance falls comprises:

in a case that the oblique distance falls within the first judgment data range, maintaining a terrain simulation flying speed of the UAV, and adjusting a terrain simulation flying height of the UAV according to the vertical distance.

9. The device as claimed in claim 8, wherein the judgment data ranges comprise a second judgment data range, and the step of adjusting the terrain simulation flying state of the UAV according to the judgment data range within which the oblique distance falls comprises:

in a case that the oblique distance is switched to falling within the first judgment data range from the second judgment data range after the oblique distance falls within the second judgment data range within a second schedule time, maintaining the terrain simulation flying speed of the UAV, and adjusting the terrain simulation flying height of the UAV according to the vertical distance, the second schedule time is smaller than the first schedule time.

10. The device as claimed in claim 9, wherein the judgment data ranges comprise a third judgment data range, and the step of adjusting the terrain simulation flying state of the UAV according to the judgment data range within which the oblique distance falls comprises:

in a case that the oblique distance falls within the third judgment data range, making the UAV hover, and raising the terrain simulation flying height of the UAV; and in a case that falling of the oblique distance within the third judgment data range is switched into falling into the second judgment data range, recovering the terrain simulation flying speed of the UAV, and controlling the terrain simulation flying height of the UAV according to the vertical distance.

11. The device as claimed in claim 9, wherein the judgment data ranges comprise a fourth judgment data range, and the step of adjusting the terrain simulation flying state of the UAV according to the judgment data range within which the oblique distance falls comprises:

in a case that the oblique distance always falls within the fourth judgment data range within a third schedule time, decreasing the terrain simulation flying speed of the UAV, and reducing the terrain simulation flying height of the UAV; and in a case that falling within the fourth judgment data range is switched to falling within the first judgment data range after the oblique distance falls within the fourth judgment data range within a fourth schedule time, maintaining the terrain simulation flying speed of the UAV, and adjusting the terrain simulation flying height of the UAV according to the vertical distance, the fourth schedule time is smaller than the third schedule time.

12. The device as claimed in claim 7, wherein the judgment data ranges comprise a fifth judgment data range, and the step of adjusting the terrain simulation flying state of the UAV according to the judgment data range within which the oblique distance falls comprises:

in a case that the oblique distance falls within the fifth judgment data range, making the UAV hover, or controlling the UAV to return.

13. An Unmanned Aerial Vehicle (UAV), comprising:

at least one vertically-downward vertical distance sensor, configured to measure a vertical distance between the UAV and a ground;

at least one obliquely-downward oblique distance sensor, configured to measure an oblique distance between the UAV and the ground; and the device for terrain simulation flying of the UAV as claimed in claim 7.

14. An Unmanned Aerial Vehicle (UAV), comprising:

at least one vertically-downward vertical distance sensor, configured to measure a vertical distance between the UAV and a ground;

at least one obliquely-downward oblique distance sensor, configured to measure an oblique distance between the UAV and the ground; and the device for terrain simulation flying of the UAV as claimed in claim 12.

15. An Unmanned Aerial Vehicle (UAV), comprising:
at least one vertically-downward vertical distance sensor, configured to measure a vertical distance between the UAV and a ground;
at least one obliquely-downward oblique distance sensor, configured to measure an oblique distance between the UAV and the ground; and
the device for terrain simulation flying of the UAV as claimed in claim 8.

16. An Unmanned Aerial Vehicle (UAV), comprising:
at least one vertically-downward vertical distance sensor, configured to measure a vertical distance between the UAV and a ground;
at least one obliquely-downward oblique distance sensor, configured to measure an oblique distance between the UAV and the ground; and
the device for terrain simulation flying of the UAV as claimed in claim 9.

17. An Unmanned Aerial Vehicle (UAV), comprising:
at least one vertically-downward vertical distance sensor, configured to measure a vertical distance between the UAV and a ground;
at least one obliquely-downward oblique distance sensor, configured to measure an oblique distance between the UAV and the ground; and
the device for terrain simulation flying of the UAV as claimed in claim 10.

18. An Unmanned Aerial Vehicle (UAV), comprising:
at least one vertically-downward vertical distance sensor, configured to measure a vertical distance between the UAV and a ground;
at least one obliquely-downward oblique distance sensor, configured to measure an oblique distance between the UAV and the ground; and
the device for terrain simulation flying of the UAV as claimed in claim 11.

\* \* \* \* \*